United States Patent
Narayanan et al.

(10) Patent No.: US 11,212,173 B2
(45) Date of Patent: Dec. 28, 2021

(54) MODEL-DRIVEN TECHNIQUE FOR VIRTUAL NETWORK FUNCTION REHOMING FOR SERVICE CHAINS

(71) Applicants: AT&T Intellectual Property I, L.P., Atlanta, GA (US); The Research Foundation For The State University of New York, Albany, NY (US)

(72) Inventors: Shankaranarayanan Puzhavakath Narayanan, Hillsborough, NJ (US); Bharath Balasubramanian, Princeton, NJ (US); Gueyoung Jung, Belle Mead, NJ (US); Muhammad Wajahat, Stony Brook, NY (US); Anshul Gandhi, Westbury, NY (US)

(73) Assignees: AT&T Intellectual Property I, L.P., Atlanta, GA (US); The Research Foundation for the State University of New York, Albany, NY (US)

( * ) Notice: Subject to any disclaimer, the term of this patent is extended or adjusted under 35 U.S.C. 154(b) by 0 days.

(21) Appl. No.: 16/712,594

(22) Filed: Dec. 12, 2019

(65) Prior Publication Data
US 2021/0184925 A1 Jun. 17, 2021

(51) Int. Cl.
| H04L 12/917 | (2013.01) |
| H04L 12/725 | (2013.01) |
| H04L 12/911 | (2013.01) |
| H04L 12/841 | (2013.01) |
| G06F 9/455 | (2018.01) |
| H04L 12/24 | (2006.01) |
| H04L 29/08 | (2006.01) |

(52) U.S. Cl.
CPC .......... *H04L 41/0816* (2013.01); *H04L 67/10* (2013.01)

(58) Field of Classification Search
CPC .......................... H04L 41/0816; H04L 67/10
See application file for complete search history.

(56) References Cited

U.S. PATENT DOCUMENTS

2016/0328252 A1* 11/2016 Singh .................. G06F 9/45558
2017/0371692 A1* 12/2017 Connolly ............ G06F 9/45558
2018/0262431 A1* 9/2018 Zhang .................. H04L 47/125
(Continued)

FOREIGN PATENT DOCUMENTS

CN 107819662 A * 3/2018
CN 110505099 A * 11/2019

*Primary Examiner* — Christopher B Robinson
(74) *Attorney, Agent, or Firm* — Jay H. Anderson; Guntin & Gust, PLC

(57) ABSTRACT

A system that determines whether a trigger has occurred within a cloud infrastructure. The system, in response to determining that a trigger has occurred, extracts characteristics from one or more virtual network functions (VNFs) of a service chain. The system, in response to extracting characteristics from the one or more VNFs, determines rehoming actions for each of the one or more VNFs. The system, in response to determining rehoming actions, predicts a rehoming delay or a chain downtime for each of the rehoming actions for each of the one or more VNFs. The system determines an optimal rehoming action from the rehoming actions for at least one of the one or more VNFs using the rehoming delay or the chain downtime for each rehoming action of the rehoming actions. The system performs the optimal rehoming action for the at least one of one or more VNFs.

20 Claims, 9 Drawing Sheets

(56) References Cited

U.S. PATENT DOCUMENTS

2019/0052549 A1* 2/2019 Duggal ................. G06Q 30/04
2019/0058633 A1* 2/2019 Chapalamadugu ... H04L 41/145
2019/0132211 A1* 5/2019 Yeung ................. H04L 41/0816

* cited by examiner

MODEL-DRIVEN TECHNIQUE FOR VIRTUAL NETWORK FUNCTION REHOMING FOR SERVICE CHAINS

STATEMENT REGARDING FEDERALLY SPONSORED RESEARCH OR DEVELOPMENT

This invention was made with government support under Grant No. CNS-1617046 awarded by the National Science Foundation. The government has certain rights in the invention.

TECHNICAL FIELD

The present disclosure relates generally to systems and methods for network services and more particularly to systems and methods for performing rehoming actions on virtual network functions in a cloud environment.

BACKGROUND

Communication networks have migrated from using specialized networking equipment executing on dedicated hardware, like routers, firewalls, and gateways, to software designed networks (SDNs) executing as virtualized network functions (VNF) in a cloud infrastructure. To provide a service, a set of VNFs may be instantiated on the general-purpose hardware. Each VNF may require one or more virtual machines (VMs) to be instantiated. In turn, VMs may require various resources, such as memory, virtual computer processing units (vCPUs), and network interfaces or network interface cards (NICs). Determining how to assign these resources among VMs in an efficient manner may be unbearably complex.

Network service providers often run service chains of VNFs on privately owned clouds with limited capacity. These specialized service chains need to meet strict Service Level Objectives (SLOs), especially along the lines of availability (e.g., first responder services). Hence, VNFs in such thinly provisioned clouds may need to be frequently moved, or rehomed, when reacting to various cloud events like hotspots, failures, and upgrades. Currently strategies for rehoming VNFs consider a singular approach leading to inefficiencies and delays in cloud operations.

Accordingly, there is a need to develop a rehoming approach that is more flexible and dynamic.

SUMMARY

Disclosed herein are systems, methods, and computer useable media for providing a rehoming recommendation for one or more virtual network functions (VNFs) within a service chain.

In one example, an apparatus for providing a rehoming recommendation for one or more virtual network functions (VNFs) within a service chain. The apparatus includes a processor and memory. The processor effectuates operations including determining whether a trigger has occurred within a cloud infrastructure. The processor further effectuates operations including, in response to determining that a trigger has occurred, extracting characteristics from one or more virtual network functions (VNFs) of a service chain within the cloud infrastructure. The processor further effectuates operations including, in response to extracting characteristics from the one or more VNFs of the service chain, determining rehoming actions for each of the one or more VNFs of the service chain. The processor further effectuates operations including, in response to determining rehoming actions, predicting a rehoming delay or a chain downtime for each of the rehoming actions for each of the one or more VNFs of the service chain. The processor further effectuates operations including, determining an optimal rehoming action from the rehoming actions for at least one of the one or more VNFs in the service chain using the rehoming delay or the chain downtime for each rehoming action of the rehoming actions. The processor further effectuates operations including, performing the optimal rehoming action for the at least one of one or more VNFs in the service chain.

The present disclosure is directed to a system including a processor and a memory coupled with the processor, the memory storing an analytics application. The processor effectuates operations including determining whether a trigger has occurred within a cloud infrastructure. The processor further effectuates operations including, in response to determining that a trigger has occurred, extracting characteristics from one or more virtual network functions (VNFs) of a service chain within the cloud infrastructure. The processor further effectuates operations including, in response to extracting characteristics from the one or more VNFs of the service chain, determining rehoming actions for each of the one or more VNFs of the service chain. The processor further effectuates operations including, in response to determining rehoming actions, predicting a rehoming delay or a chain downtime for each of the rehoming actions for each of the one or more VNFs of the service chain. The processor further effectuates operations including, determining an optimal rehoming action from the rehoming actions for at least one of the one or more VNFs in the service chain using the rehoming delay or the chain downtime for each rehoming action of the rehoming actions. The processor further effectuates operations including, performing the optimal rehoming action for the at least one of one or more VNFs in the service chain.

The present disclosure is also directed to a computer readable storage medium storing computer executable instructions that when executed by a computing device cause said computing device to effectuate operations including determining whether a trigger has occurred within a cloud infrastructure. The computer readable storage medium may further, in response to determining that a trigger has occurred, extract characteristics from one or more virtual network functions (VNFs) of a service chain within the cloud infrastructure. The computer readable storage medium may further, in response to extracting characteristics from the one or more VNFs of the service chain, determine rehoming actions for each of the one or more VNFs of the service chain. The computer readable storage medium may further, in response to determining rehoming actions, predict a rehoming delay or a chain downtime for each of the rehoming actions for each of the one or more VNFs of the service chain. The computer readable storage medium may further determine an optimal rehoming action from the rehoming actions for at least one of the one or more VNFs in the service chain using the rehoming delay or the chain downtime for each rehoming action of the rehoming actions. The computer readable storage medium may further perform the optimal rehoming action for the at least one of one or more VNFs in the service chain.

DETAILED DESCRIPTION OF ILLUSTRATIVE EXAMPLES

Figure 1:
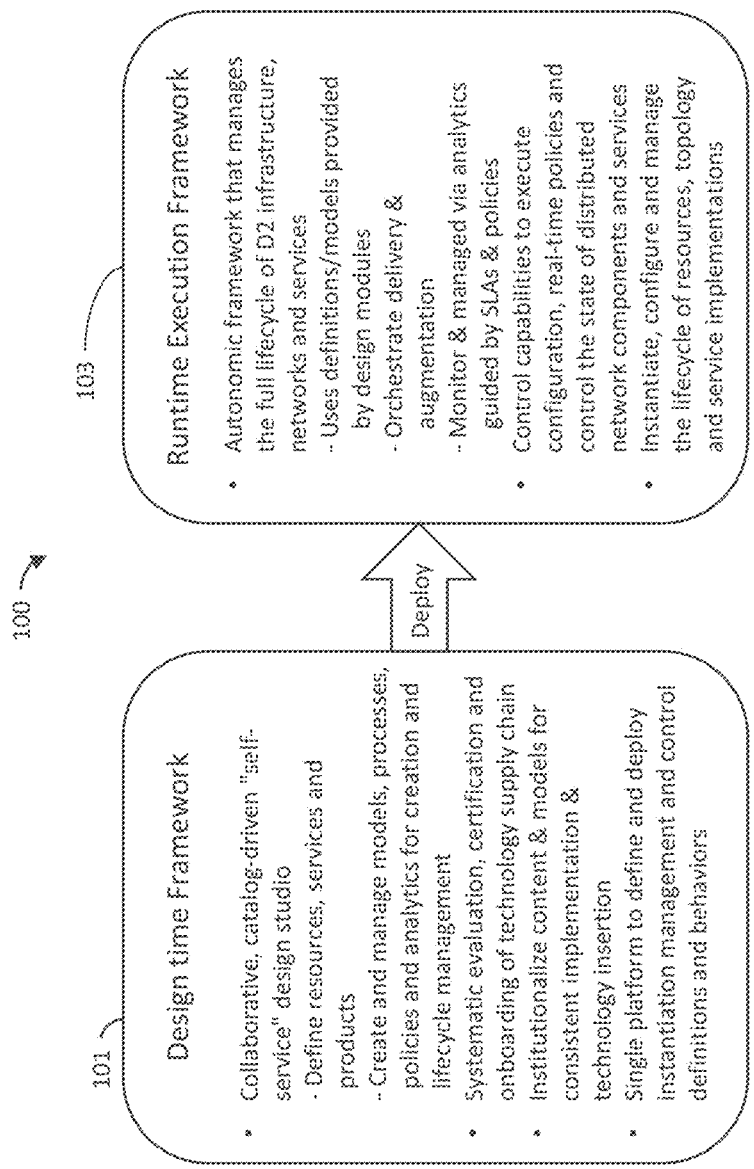
FIG. 1 is a block diagram illustrating the architecture of an enhanced control, orchestration, management, and policy platform according to one or more examples of the present disclosure.

Network function virtualization (NFV) has several benefits such as cost-efficient deployment on commodity hardware, elasticity, and reduced tie-in to proprietary hardware. Accordingly, Network Service Providers (NSPs) are increasingly utilizing Virtual Network Function (VNF) chains to provide integrated network services on a virtualized infrastructure.

To maintain the performance, resiliency and stability of these network services, Service Level Objectives (SLOs) are often implemented for VNF service chains. For example, first responder services (e.g., EMS, police, fire) may require "5-9s" or 99.999% system availability, which can prove challenging in light of network issues (e.g., hotspots, virtual machine (VM) workload shifts, network failures, network upgrades, etc.) because the network issues tend to lower performance and availability of the service within a cloud environment.

To compensate for SLO requirements, cloud providers often rely on redundancy and over provisioning. In instances where resources are constrained (e.g., systems with access to few servers (e.g., 10-500 servers) to perform cloud compute services, cloud providers often rehome (or move) one or more VNFs (or VMs, used interchangeably) of a service chain to a different host. Rehoming typically involves applying the same corrective action, such as VM live migration to an entire service chain (e.g., all VNFs in the service chain). However, applying the same corrective action in when rehoming VNFs is inefficient leading to chain rehoming, as well as chain downtime.

Addressing the current inefficiencies in rehoming is challenging because solutions that would possibly use rehoming actions in addition to live migration would have to take into account the following: (1) not all rehoming actions are feasible for certain VNFs. For instance, a rehoming action 'rebuild', which inherently loses the state of the VM, is not feasible for stateful VNFs and the rehoming action 'live migration' may time out on a VNF with heavy memory churn, rendering it an infeasible option; (2) an optimality of a rehoming action could vary based on an objective (e.g., rehoming cost) under consideration. (3) rehoming actions have a complex interaction within a cloud environment creating subtleties when selecting a rehoming action, as well as potential ripple effects of rehoming action selections for a given VNF. For example, while the rehoming action 'rebuild', which involves taking down an original VM and rebuilding the VM from the VM's image while retaining some metadata (e.g., IP address and interfaces), is relatively unaffected by a VNF disk size or available bandwidth, the rehoming actions 'cold migration', which involves migrating a VM with its disk contents, or 'live migration', which involves migrating a an active VM instance to a different host, is affected by the VNF disk size or available bandwidth.

Accordingly, there is a need for a rehoming solution that addresses the current inefficiencies of rehoming while considering the challenges in deciding how and when rehoming actions in addition to live migration should be used.

Illustrated in FIG. 1 is a schematic of the architecture of an enhanced control, orchestration, management, and policy platform, (ECOMP platform 100) that is implemented in a cloud environment. The ECOMP platform 100 includes a design time framework component 101 and a runtime execution framework 103. The cloud environment provides a number of capabilities including real-time instantiation of virtual machines (VMs) on commercial hardware where appropriate; dynamic assignment of application and workloads to VMs; dynamic movement of applications and dependent functions to different VMs on servers within and across data centers in different geographies (within the limits of physical access tiedowns constraints); and dynamic control of resources made available to applications (CPU, memory, storage). With the use of network function virtualization, network appliances have been transformed into software applications. In the integrated cloud environment, the dynamic cloud capabilities are applied to applications—i.e., virtual network functions (VNFs)—thus applying the benefits of the cloud environment to virtual network elements. For example, VNFs, such as routers, switches, firewalls, can be "spun up" on commodity hardware, moved from one data center to another center dynamically (within the limits of physical access tie-down constraints) and resources such as CPU, memory and storage can be dynamically controlled.

The ECOMP platform 100 enables the rapid on-boarding of new services and the reduction of operating expenses and capital expenses through its metadata-driven service design and creation platform and its real-time operational management framework—a framework that provides real-time, policy driven automation of management functions. The metadata-driven service design and creation capabilities enable services to be defined with minimal information technology development required thus contributing to reductions in capital expenses. Real-time operational management framework provides significant automation of network management functions enabling the detection and correction of problems in an automated fashion contributing to reductions in operating expenses.

The ECOMP platform 100 enables product/service independent capabilities for design, creation, and lifecycle management. The design time framework component 101 is an integrated development environment with tools, techniques, and repositories for defining/describing network assets. The design time framework component 101 facilitates re-use models thus improving efficiency as more models are available for reuse. Assets include models of the cloud environment resources, services, and products. The models include various process specifications and policies (e.g., rule sets) for controlling behavior and process execution. Process specifications are used by the ECOMP platform 100 to automatically sequence the instantiation, delivery and lifecycle management aspects of the integrated cloud environment-based resources, services, products, and the components of the ECOMP platform 100. The design time framework component 101 supports the development of new capabilities, augmentation of existing capabilities and operational improvements throughout the lifecycle of a service. Service design and creation (SDC), policy, and data collection, analytics, and events (DCAE) software development kits (SDKs) allow operations/security, 3rd parties (e.g., vendors), and other experts to continually define/refine new collection, analytics, and policies (including recipes for corrective/remedial action) using a design framework portal. Certain process specifications (aka 'recipes') and policies are geographically distributed to many points of use to optimize performance and maximize autonomous behavior in integrated cloud environment's federated cloud environment.

The runtime execution framework 103 executes the rules and policies distributed by a design and creation environment. This allows for the distribution of policy enforcement and templates among various ECOMP modules (described below). These components advantageously use common services that support logging, access control, and data management.

Figure 2:
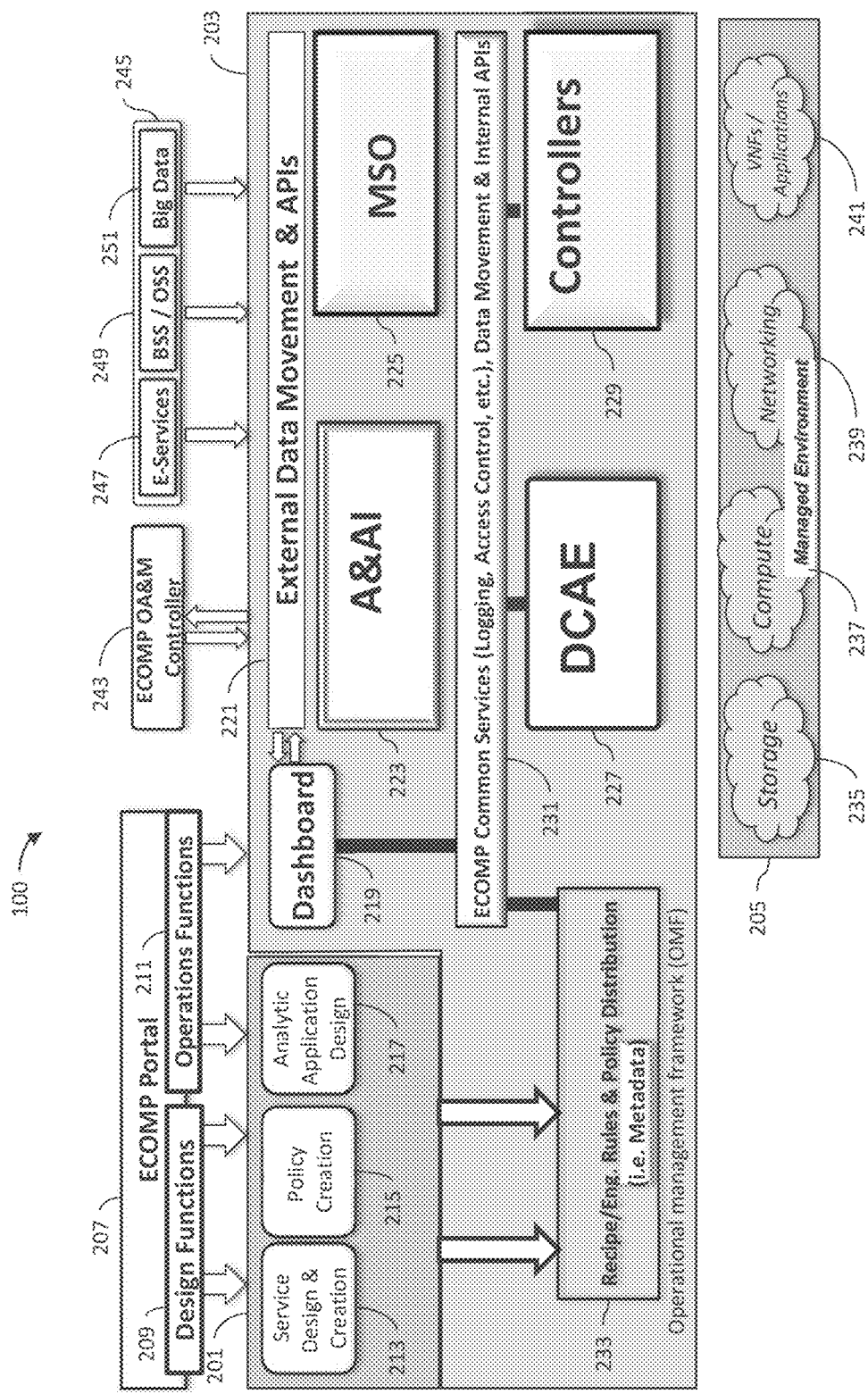
FIG. 2 is a block diagram of a platform for enhanced control, orchestration, management, and policy according to one or more examples of the present disclosure.

Illustrated in FIG. 2 are the components of an example of the ECOMP platform 100. The ECOMP platform 100 is provided with three environments. These are the design creation environment 201, the execution environment 203, and the managed environment 205 shown as shaded areas in FIG. 2.

The ECOMP platform 100 includes an ECOMP Portal 207 that provides design functions 209 and operations functions 211. The design functions 209 include a service design and creation component 213 and policy creation component 215. The operations functions 211 include analytic application design component 217 and a dashboard 219. The service design and creation component 213, the policy creation component 215 and analytic application design component 217 are all part of the design creation environment 201. The dashboard is part of the execution environment 203.

In addition to the dashboard 219 the execution environment 203 includes: an external data movement and application program interface component, (API component 221); an active and available inventory module, (A&AI module 223); a master service orchestrator, (MSO 225); a data collection, analytics and events component, (DCAE module 227); controllers 229; a common services component 231; and a recipe/engineering rules and policy distribution component 233.

The managed environment 205 comprises resources, either hardware or software, that may be categorized as: infrastructure resources—(the Cloud resources, e.g., Storage 235, Compute 237); networking resources 239 (network connectivity functions & elements); and VNF/application resources 241 (the features and capabilities of a software application).

Interacting with the execution environment may be an operations, administration, and management controller, (OA&M Controller 243); and a number of external applications 245 that may include e-services 247, business support system and operational support systems, (BSS/OSS application 249), and big data services 251, among others.

Figure 3:
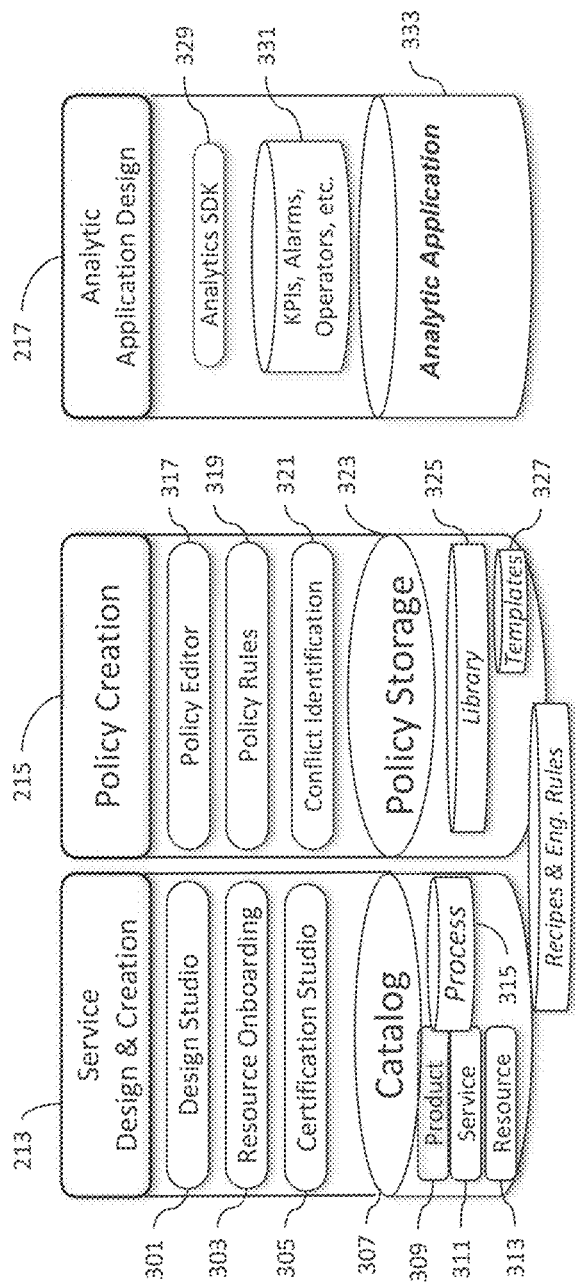
FIG. 3 is a block diagram of the service design and creation component, the policy creation component and the analytic application design component of the platform for enhanced control, orchestration, management, and policy according to one or more examples of the present disclosure.

Illustrated in FIG. 3 are the subcomponents of the service design and creation component 213. The service design and creation component 213 is an integrated development environment with tools, techniques, and repositories to define/simulate/certify cloud environment assets as well as their associated processes and policies. The service design and creation component 213 may include a design studio subcomponent 301; a resource onboarding subcomponent 303; a certification studio subcomponent 305; a catalog subcomponent 307. Catalog subcomponent 307 may include information about groups such as products 309, services 311, resources 313 and processes 315.

The policy creation component 215 deals with policies, which are conditions and requirements, constraints, attributes, or needs that must be provided, maintained, and/or enforced. At a lower level the policy creation component 215 involves machine-readable rules enabling actions to be taken based on triggers or requests. Policies often consider specific conditions in effect (both in terms of triggering specific policies when conditions are met, and in selecting specific outcomes of the evaluated policies appropriate to the conditions). Policies allow rapid updates through easily updating rules, thus updating technical behavior of components in which those policies are used, without requiring rewrites of their software code. Policies permit simpler management/control of complex mechanisms via abstraction. The policy creation component 215 may include a policy editor 317; policy rules subcomponent 319; conflict identification subcomponent 321; policy storage subcomponent 323. The policy storage subcomponent 323 may include a library 325 and templates 327.

The policy creation component 215 has a broad scope supporting infrastructure, product/services, operation automation, and security-related policy rules. These policy rules are defined by multiple stakeholders, (Network/Service Designers, Operations, Security, customers, etc.). In addition, input from various sources (service design and creation component 213, policy editor 317, customer input, etc.) are collected and rationalized. Therefore, a centralized policy creation environment will be used to validate policies rules, identify, and resolve overlaps and conflicts, and derive policies where needed. The policy creation component 215 is accessible, developed and managed as a common asset, and provides editing tools to allow users to easily create or change policy rules. Offline analysis of performance/fault/closed-loop action data are used to identify opportunities to discover new signatures and refine existing signatures and closed loop operations. Policy translation/derivation functionality is also included to derive lower level policies from higher level policies. Conflict detection and mitigation are used to detect and resolve policies that may potentially cause conflicts, prior to distribution. Once validated and free of conflicts, policies are placed in an appropriate repository.

After completing initial policy creation or modification to existing policies, the policy distribution component 233 sends policies (e.g., from the repository) to their points of use, in advance of when they are needed. This distribution is intelligent and precise, such that each distributed policy-enabled function automatically receives only the specific policies which match its needs and scope.

Notifications or events can be used to communicate links/URLs for policies to components needing policies, so that components can utilize those links to fetch particular policies or groups of policies as needed. Components in some cases may also publish events indicating they need new policies, eliciting a response with updated links/URLs. Also, in some cases policies can be given to components indicating they should subscribe to one or more policies, so that they receive updates to those policies automatically as they become available.

The analytic application design component 217 includes an analytics software development kit (SDK 329), and storage 331 for key performance indicators (KPIs), alarms, operators, etc., as well as storage for analytic application 333 (e.g., a Model-driven Rehoming Technique (MERIT) application).

Figure 4:
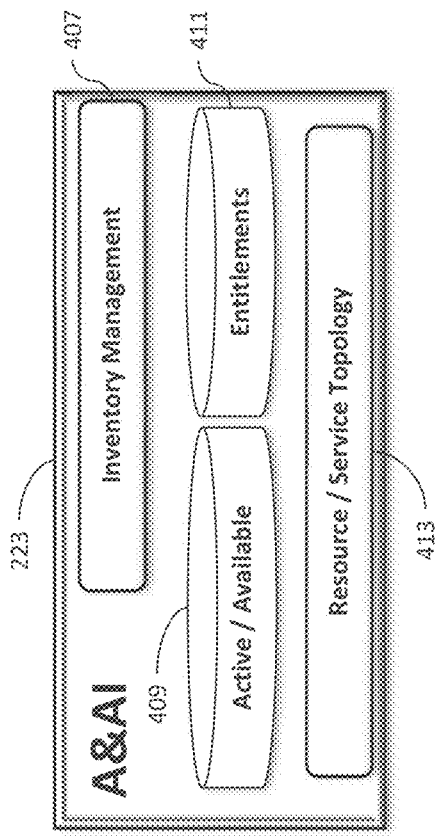
FIG. 4 is a block diagram of the dashboard and active and available inventory module of the platform for enhanced control, orchestration, management, and policy according to one or more examples of the present disclosure.
Figure 4:
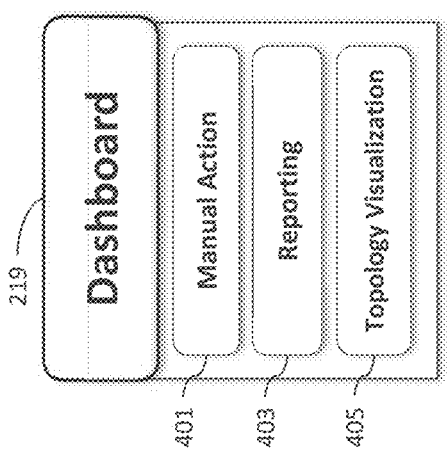

As shown in FIG. 4, the dashboard 219 includes a manual action subcomponent 401, a reporting subcomponent 403 and a topology visualization subcomponent 405. The dashboard 219 provides access to design, analytics, and operational control/administration functions.

The A&AI module 223 is the component that provides real-time views of the resources, services, products, and their relationships. The views provided by the A&AI module 223 relate data managed by multiple ECOMP platforms 100, business support systems and operation support systems, (BSS/OSS application 249), and network applications to form a "top to bottom" view ranging from the products customers buy to the resources that form the raw material for creating the products. A&AI module 223 not only forms a registry of products, services, and resources, it also maintains up-to-date views of the relationships between these inventory items. Active and available inventory submodule 409 will manage these multi-dimensional relationships in real-time. The A&AI module 223 is provided with an inventory management submodule 407, an entitlements submodule 411 and a resource/service topology submodule 413.

The inventory management submodule 407 maintains real-time inventory and topology data by being continually updated as changes are made within the integrated cloud. It uses graph data technology to store relationships between inventory items. Graph traversals can then be used to identify chains of dependencies between items. Data views of the A&AI module 223 are used by homing logic during real-time service delivery, root cause analysis of problems, impact analysis, capacity management, software license management and many other integrated cloud environment functions.

The inventory and topology data includes resources, service, products, and customer subscriptions, along with topological relationships between them. Relationships captured by A&AI module 223 include "top to bottom" relationships such as those defined in the service design and creation component 213 and when products are composed of services, and services are composed of resources. It also includes "side to side" relationships such as end to end connectivity of virtualized functions to form service chains. A&AI module 223 also keeps track of the span of control of each controller and is queried by MSO 225 and placement functions to identify which controller to invoke to perform a given operation.

A&AI module 223 is metadata driven, allowing new inventory item types to be added dynamically and quickly via catalog definitions, reducing the need for lengthy development cycles. A&AI module 223 provides the following key requirements:

Provide accurate and timely views of resource, service, and product inventory and their relationship to the customer's subscription;

Deliver topologies and graphs;

Maintain relationships to other key entities (e.g., location) as well as non-integrated cloud environment inventory;

Maintain the state of active, available, and assigned inventory within the ECOMP platform 100;

Allow introduction of new types of Resources, Services, and Products without a software development cycle (e.g., be metadata driven);

Be easily accessible and consumable by internal and external clients;

Provide functional APIs that expose invariant services and models to clients;

Provide highly available and reliable functions and APIs capable of operating as generic cloud workloads that can be placed arbitrarily within the cloud infrastructure capable of supporting those workloads;

Scale incrementally as volumes in the ECOMP platform 100 and cloud infrastructure scales;

Perform to the requirements of clients, with quick response times and high throughput;

Enable vendor product and technology swap-outs over time, e.g., migration to a new technology for data storage or migration to a new vendor for MSO 225 or Controllers 229;

Enable dynamic placement functions to determine which workloads are assigned to specific components of the ECOMP platform 100 (e.g., Controllers 229 or VNFs) for optimal performance and utilization efficiency; and Identify the controllers 229 to be used for any particular request.

A&AI module 223 also performs a number of administrative functions. Given the model driven basis of the ECOMP platform 100, metadata models for the various catalog items are stored, updated, applied and versioned dynamically as needed without taking the system down for maintenance. Given the distributed nature of the A&AI module 223 as well as the relationships with other components of the ECOMP platform 100, audits are periodically run to assure that the A&AI module 223 is in sync with the inventory masters such as controllers 229 and MSO 225. Adapters allow the A&AI module 223 to interoperate with non-integrated cloud environment systems as well as 3rd party cloud providers via evolving cloud standards.

Consistent with other applications of the ECOMP platform 100, the A&AI module 223 produces canned and ad-hoc reports, integrates with the dashboard 219, publishes notifications other components of the ECOMP platform 100 can subscribe to, and performs logging consistent with configurable framework constraints.

Figure 5:
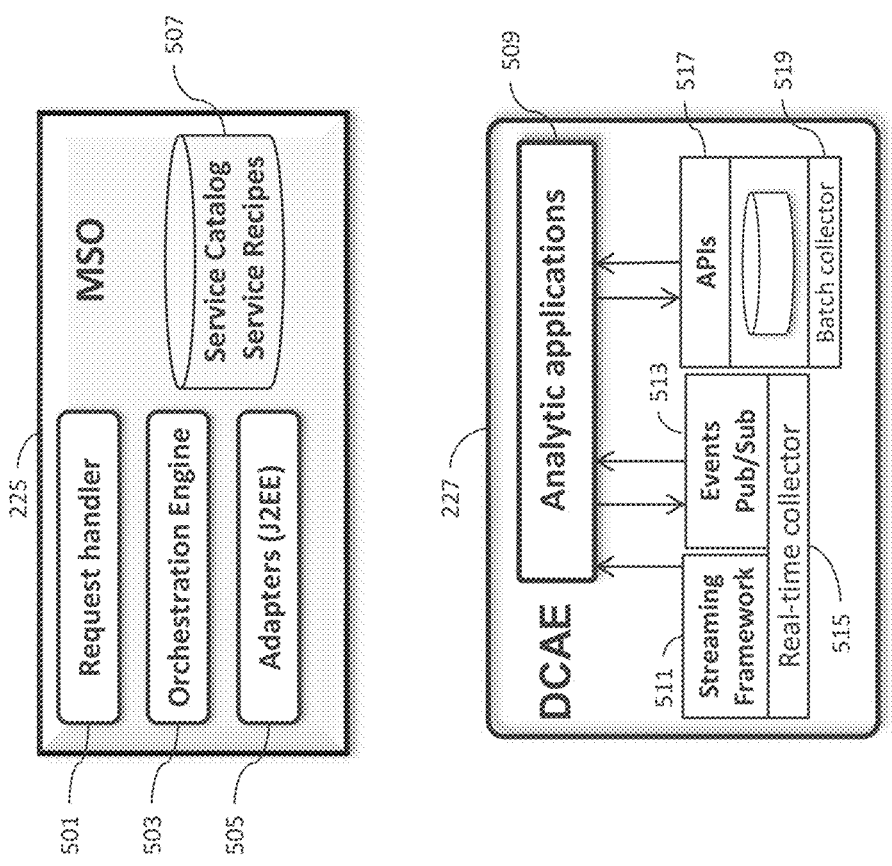
FIG. 5 is a block diagram of the master service orchestrator component and the data collection, analytics, and events component of the platform for enhanced control, orchestration, management, and policy according to one or more examples of the present disclosure.

The primary function of MSO 225 is the automation of end-to-end service instance provisioning activities. As shown in FIG. 5, MSO 225 includes a request handler 501, an orchestration engine 503, adapters 505, and service catalog service recipes 507. MSO provides an interface to orchestrate delivery of integrated cloud environment services. In general, orchestration can be viewed as the definition and execution of workflows or processes to manage the completion of a task. The ability to graphically design and modify a workflow process is the key differentiator between an orchestrated process and a standard compiled set of procedural code. Orchestration provides adaptability and improved time-to-market due to the ease of definition and change without the need for a development engagement. As such, it is a primary driver of flexibility in the architecture.

Interoperating with policies, the combination provides a basis for the definition of a flexible process that can be guided by business and technical policies and driven by process designers.

Orchestration exists throughout the integrated cloud environment architecture and is not be limited to the constraints implied by the term "workflow" as it typically implies some degree of human intervention. Orchestration in integrated cloud environment will not involve human intervention/decision/guidance in the vast majority of cases. The human involvement in orchestration is typically performed up front in the design process although there may be processes that will require intervention or alternate action such as exception or fallout processing.

To support the large number of Orchestration requests, the orchestration engine 503 will be exposed as a reusable service. With this approach, any component of the architecture can execute process recipes. Orchestration services will be capable of consuming a process recipe and executing against it to completion. The Service model maintains consistency and reusability across all orchestration activities and ensures consistent methods, structure, and version of the workflow execution environment.

As shown in FIG. 5, DCAE module 227 includes an analytic applications module 509, streaming framework 511, an events pub/sub 513, real-time collectors 515, APIs 517 and batch collector 519. In the integrated cloud environment virtualized functions across various layers of functionality are expected to be instantiated in a significantly dynamic manner that requires the ability to provide real-time responses to actionable events from virtualized resources, applications, as well as requests from customers, carrier partners and other providers. In order to engineer, plan, bill and assure these dynamic services, DCAE module 227 within the framework of the ECOMP platform 100 gathers key performance, usage, telemetry, and events from the dynamic, multi-vendor virtualized infrastructure in order to compute various analytics and respond with appropriate actions based on any observed anomalies or significant events. These significant events include application events that lead to resource scaling, configuration changes, and other activities as well as faults and performance degradations requiring healing. The collected data and computed analytics are stored for persistence as well as use by other applications for business and operations (e.g., billing, ticketing). More importantly, the DCAE module 227 has to perform a lot of these functions in real-time.

DCAE module 227 provides real-time collectors 515 necessary to collect the instrumentation made available in the integrated cloud infrastructure. The scope of the data collection includes all of the physical and virtual elements (compute, storage, and network) in the integrated cloud infrastructure. The collection includes the types of events data necessary to monitor the health of the managed environment, the types of data to compute the key performance and capacity indicators necessary for elastic management of the resources, the types of granular data (e.g., flow, session & call records) needed for detecting network & service conditions, etc. The collection will support both real-time streaming as well as batch methods of data collection.

DCAE module 227 needs to support a variety of applications and use cases ranging from real-time applications that have stringent latency requirements to other analytic applications that have a need to process a range of unstructured and structured data. DCAE module 227 needs to support all of these needs and must do so in a way that allows for incorporating new storage technologies as they become available. This may be done by encapsulating data access via APIs and minimizing application knowledge of the specific technology implementations.

Given the scope of requirements around the volume, velocity, and variety of data that DCAE module 227 needs to support, the storage may use technologies that Big Data has to offer, such as support for NOSQL technologies, including in-memory repositories, and support for raw, structured, unstructured, and semi-structured data. While there may be detailed data retained at the edge layer of DCAE module 227 for detailed analysis and trouble-shooting, applications may optimize the use of bandwidth and storage resources by ensuring they propagate only the required data (reduced, transformed, aggregated, etc.) for other analyses.

The DCAE module 227 includes an analytic framework which is an environment that allows for development of real-time applications (e.g., analytics, anomaly detection, capacity monitoring, congestion monitoring, alarm correlation etc.) as well as other non-real-time applications (e.g., analytics, forwarding synthesized or aggregated or transformed data to Big Data stores and applications); the intent is to structure the environment that allows for agile introduction of applications from various providers (Labs, IT, vendors, etc.). The framework supports the ability to process both a real-time stream of data as well as data collected via traditional batch methods. The analytic framework supports methods that allow developers to compose applications that process data from multiple streams and sources. Analytic applications are developed by various organizations; however, they all run in the DCAE module 227 and are managed by a DCAE controller (not shown). These applications are microservices developed by a broad community and adhere to the standards of the ECOMP platform 100.

The following list provides examples of types of applications that can be built on top of DCAE module 227 and that depend on the timely collection of detailed data and events by DCAE module 227. Analytics applications will be the most common applications that are processing the collected data and deriving interesting metrics or analytics for use by other applications or operations. These analytics range from very simple ones (from a single source of data) that compute usage, utilization, latency, etc. to very complex ones that detect specific conditions based on data collected from various sources. The analytics could be capacity indicators used to adjust resources or could be performance indicators pointing to anomalous conditions requiring response. The Fault/Event Correlation application is a key application that processes events and thresholds published by managed resources or other applications that detect specific conditions. Based on defined rules, policies, known signatures and other knowledge about the network or service behavior, this application would determine root cause for various conditions and notify interested applications and operations. A performance surveillance and visualization application provides a window to operations notifying them of network and service conditions. The notifications could include outages and impacted services or customers based on various dimensions of interest to Operations. They provide visual aids ranging from geographic dashboards to virtual information model browsers to detailed drilldown to specific service or customer impacts. The capacity planning application provides planners and engineers the ability to adjust forecasts based on observed demands as well as plan specific capacity augments at various levels, e.g., network functions virtualization infrastructure (NFVI) level (technical plant, racks, clusters, etc.), Network level (bandwidth, circuits, etc.), Service or Customer levels. A testing and trouble-shooting application provides operations the tools to test and trouble-shoot specific conditions. They could range from simple health checks for testing purposes, to complex service emulations orchestrated for troubleshooting purposes. In both cases, DCAE module 227 provides the ability to collect the results of health checks and tests that are conducted. These checks and tests could be done on an ongoing basis, scheduled or conducted on demand. Some components of integrated cloud environment may expose new targets for security threats. Orchestration and control, decoupled hardware and software, and commodity hardware may be more susceptible to attack than proprietary hardware. However, software designed networks (SDN) and virtual networks also offer an opportunity for collecting a rich set of data for security analytics applications to detect anomalies that signal a security threat, such as distributed denial of service (DDoS) attack, and automatically trigger mitigating action. The applications that are listed above are by no means exhaustive and the open architecture of DCAE module 227 will lend itself to integration of application capabilities over time from various sources and providers.

Figure 6:
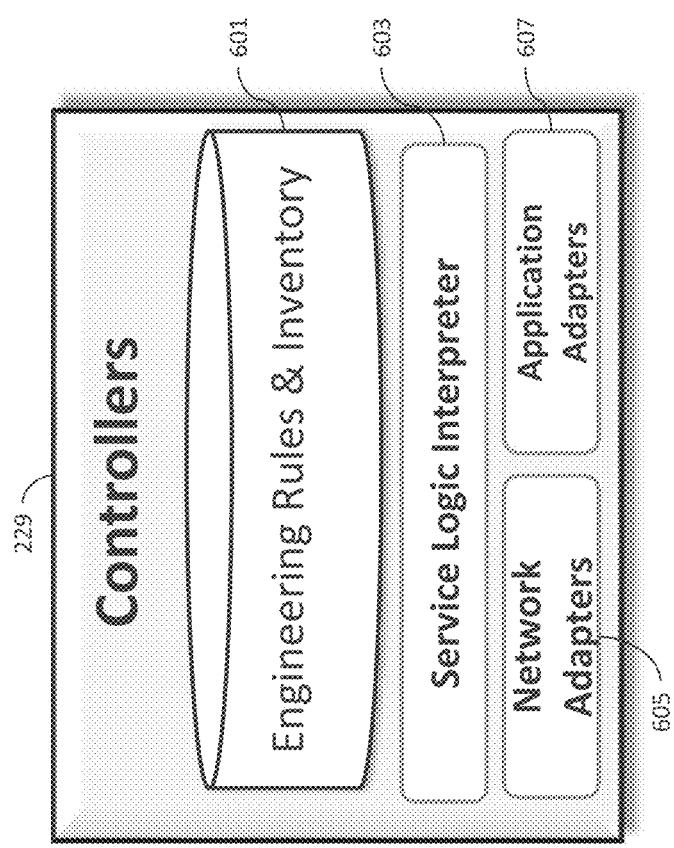
FIG. 6 is a block diagram of the components for the controllers of the platform for enhanced control, orchestration, management, and policy according to one or more examples of the present disclosure.

Illustrated in FIG. 6 are the components of the controllers 229. Controllers 229 include an engineering rules and inventories module 601, a service logic interpreter module 603; a network adapter module 605, and an application adapter module 607. Controllers are applications which are intimate with cloud and network services and execute the configuration, real-time policies, and control the state of distributed components and services.

Figure 7:
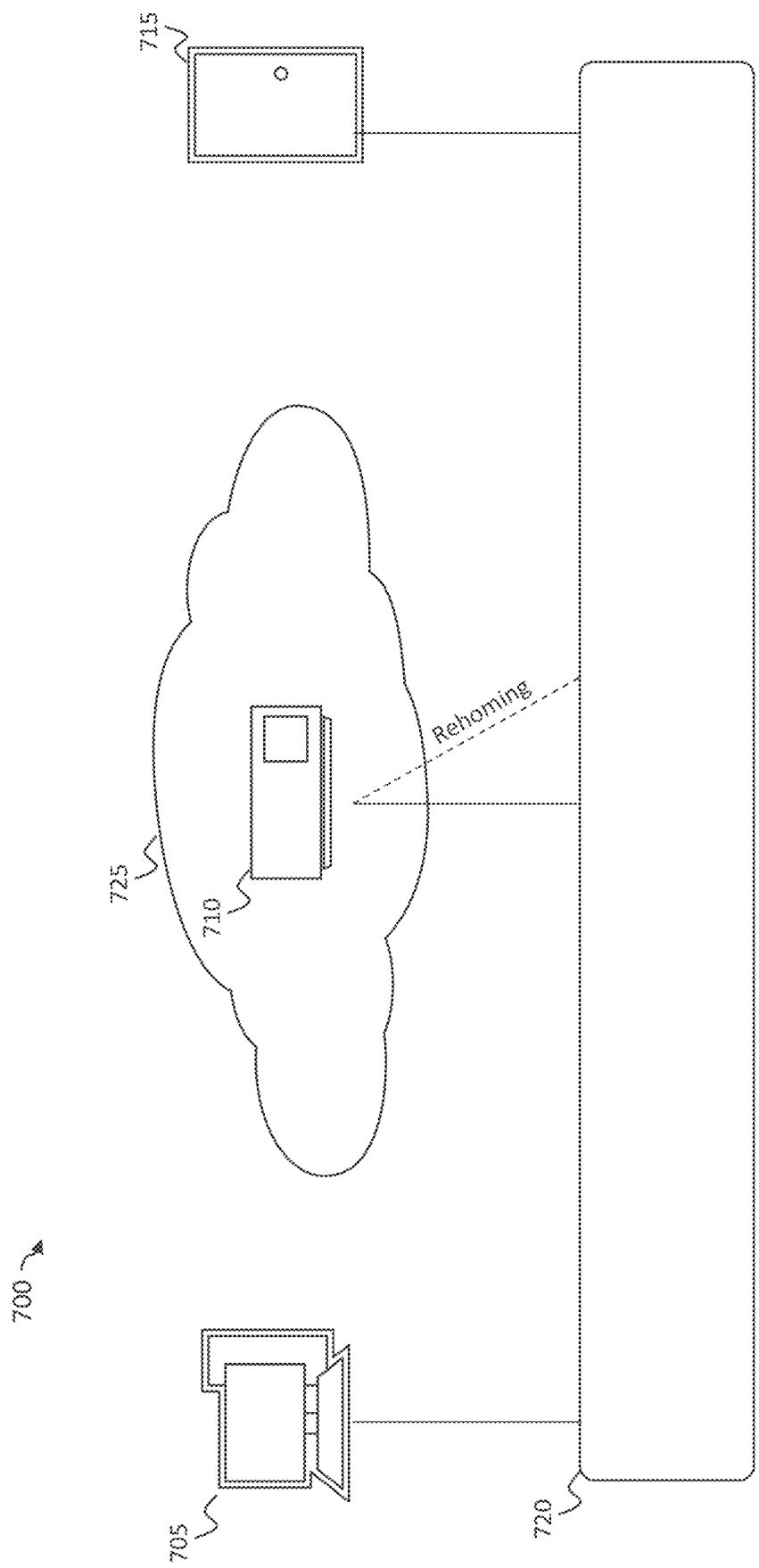
FIG. 7 is a block diagram illustrating an exemplary system including a service chain and service chain analyzer according to one or more examples of the present disclosure.

Illustrated in FIG. 7 is an exemplary system 700 including a service chain and service chain analyzer according to one or more examples of the present disclosure, which may be a part of the ECOMP platform 100 (e.g., DCAE module 227). System 700 may include a client virtual machine (VM) 705, a switch VM 710 located within a cloud 725, and a server VM 715, which may be connected to a testbed 720. The testbed 720 may include a plurality of servers using a cloud operating system that controls large pools of compute, storage, and networking resources (e.g., as OpenStack). Service chains may be deployed on VMs hosted on the testbed 720 for testing and analysis. Cloud 725 may be owned and operated by a service provider.

Data from the service chains may be collected in response to ping traffic going from client VM 705 to server VM 715 via the switch VM 710. For example, the data collected may be in light of rehoming actions (e.g., rebuild, cold migrate, or live migrate) conducted on a switch VNF under various configurations, while the client VM 705 and server VM 715 reside outside the cloud 725. Under such considerations, an analysis of rehoming costs in view of shared storage or non-shared storage may be conducted using a graybox approach because the service provider has information (e.g., a statefulness of certain VNFs that may be used to provide integrated network services to tenants of a cloud) related a cloud infrastructure of the service provider.

The analysis can involve utilizing a Model-driven Rehoming Technique (MERIT) to model a rehoming cost for each rehoming action available to a VNF in the service chain as a utility function that considers the following cost: (1) rehoming delay or (2) connectivity downtime. The rehoming delay may be a time to perform a rehoming action, which represents a (resource) cost incurred by a service provider to rehome the VNF. For example, the rehoming delay may be based on relevant timestamped entries in OpenStack logs or from a Nova status API within OpenStack. The connectivity downtime may be a time until a service chain's end-to-end connectivity is restored and represents a performance loss for a tenant due to rehoming. For example, the connectivity downtime may be a calculation of a delay between successful pings from the client VM 705 to the server VM 715 in the service chain. The rehoming model may also consider different VNF configurations (e.g., varying image or disk sizes) to analyze rehoming costs. The rehoming model of MERIT may consider different VNF behaviors, such as varying page dirty rate (PDR). The rehoming model may also consider different infrastructure parameters (e.g., available network bandwidth, VM CPU usage, or I/O contention. MERIT may also be integrated into OpenStack.

Results of modeling the rehoming cost for each rehoming action available to a VNF in the service chain in consideration of rehoming delay, connectivity downtime, or an associated effect of various system parameters on different rehoming actions can be used to guide decisions of MERIT when identifying an optimal rehoming action (a preferred rehoming action in consideration of a rehoming cost for each rehoming action available to a VNF in the service chain, which may be determined based on an associated rehoming delay, connectivity downtime, or an associated effect of various system parameters (e.g., a lowest rehoming delay, a lowest connectivity downtime, or lowest combination of rehoming delay or connectivity downtime)) for each VNF in the service chain. MERIT may take into account a plurality of factors. A first factor may be that while rehoming delay is typically higher for the rehoming action 'cold migrate' than the rehoming action 'rebuild' due to additional disk state migration under cold migrate, the connectivity downtime may be higher for rebuild than cold migrate. For example, for a medium instance size (e.g., 4 GB) and disk size (e.g., 700 MB) under a high background I/O, a rebuild may incur a connectivity downtime of approximately 180 seconds, whereas cold migrate may incur a connectivity downtime of approximately 97 seconds because a rebuild necessitates a post-boot (re)configuration, unlike cold migrate. A second factor may be that for larger disk sizes, while the rehoming action 'rebuild' has a connectivity downtime of 180 seconds which is similar to the connectivity downtime associated with the first factor, the rehoming action 'cold migrate' incurs 238 seconds of connectivity downtime. Accordingly, there is a similar tradeoff under non-shared storage scenarios. A third factor may be that under a shared storage scenario, if the rehoming action 'live migrate' does not time out (e.g., the workload does not aggressively dirty the memory), live migrate may be an optimal choice when considering connectivity downtime. A fourth factor may be that under a shared storage scenario, even when considering negligible PDR, a rehoming delay may be typically higher for the rehoming action 'live migrate' when compared to the rehoming action 'rebuild'. When considering a moderate PDR, the rehoming action 'cold migrate' may have a lower rehoming delay than the rehoming action 'live migrate'. A fifth factor may be that under a non-shared storage scenario, the rehoming action 'live migrate' may not infeasible.

When applying the results gleaned from modeling the rehoming cost of a VNF of a service chain (e.g., the client-switch-server VNF chain described in FIG. 7), MERIT may use the results to predict optimal rehoming actions for each VNF in the service chain in consideration of resource contention (network contention) due to simultaneous rehoming of each VNF in the service chain. MERIT may utilize statistical analysis (e.g., linear regression or support vector regression) or machine learning (e.g., neural networks) to train the rehoming delay or connectivity downtime models, which may be used to refine predicting optimal rehoming actions. For example, the neural network may be used that considers different activation functions for a hidden layer: (i) sigmoid, or (ii) rectified linear unit (ReLU).

Training may be different for different rehoming actions. For example, for the rehoming action 'rebuild', the following features may be used: (i) image size of an original VM (IMG), (ii) an instance size, denoted by its memory capacity (MEM), (iii) VM CPU usage (CPU), (iv) available bandwidth (BW), (v) mean I/O wait time (IOµ), or (vi) standard deviation of I/O wait time (IOσ). These features may be used because a rebuild involves booting a new VM using an image and because the instance size and I/O load impact the rehoming cost under a rebuild. System-level features, CPU or BW, may be used to determine any impact these features may have on the rehoming costs. For example, for the rehoming action 'cold migrate', in addition to the above features, a disk size (DSK) may be used since cold migrate involves moving the disk contents. To capture I/O contention due to cold migrate, average I/O operations per second (IOPS), as well as read and write bit rates may be used. For example, for the rehoming action 'live migration', the following features may be used: (i) instance size (MEM), (ii) network bandwidth (BW), (iii) page dirty rate (PDR), (iv) working set size (WSS), (v) modified words per page (MWP), (vi) working set entropy (WSE), and (vii) nonworking set entropy (NWSE). The features PDR, WSS, MWP, WSE, or NMWSE, may be measured periodically (e.g., every second), and the most recent measurements (just before rehoming) may be used as feature values for training the rehoming delay or connectivity downtime models. To capture I/O contention due to live migrate, average I/O operations per second (IOPS), as well as read and write bit rates may be used. Based on training results using a plurality of data points, MERIT may employ linear regression models for rebuild or cold migrate rehoming costs and employ a neural network NN with ReLU activation function for live migration.

Figure 8:
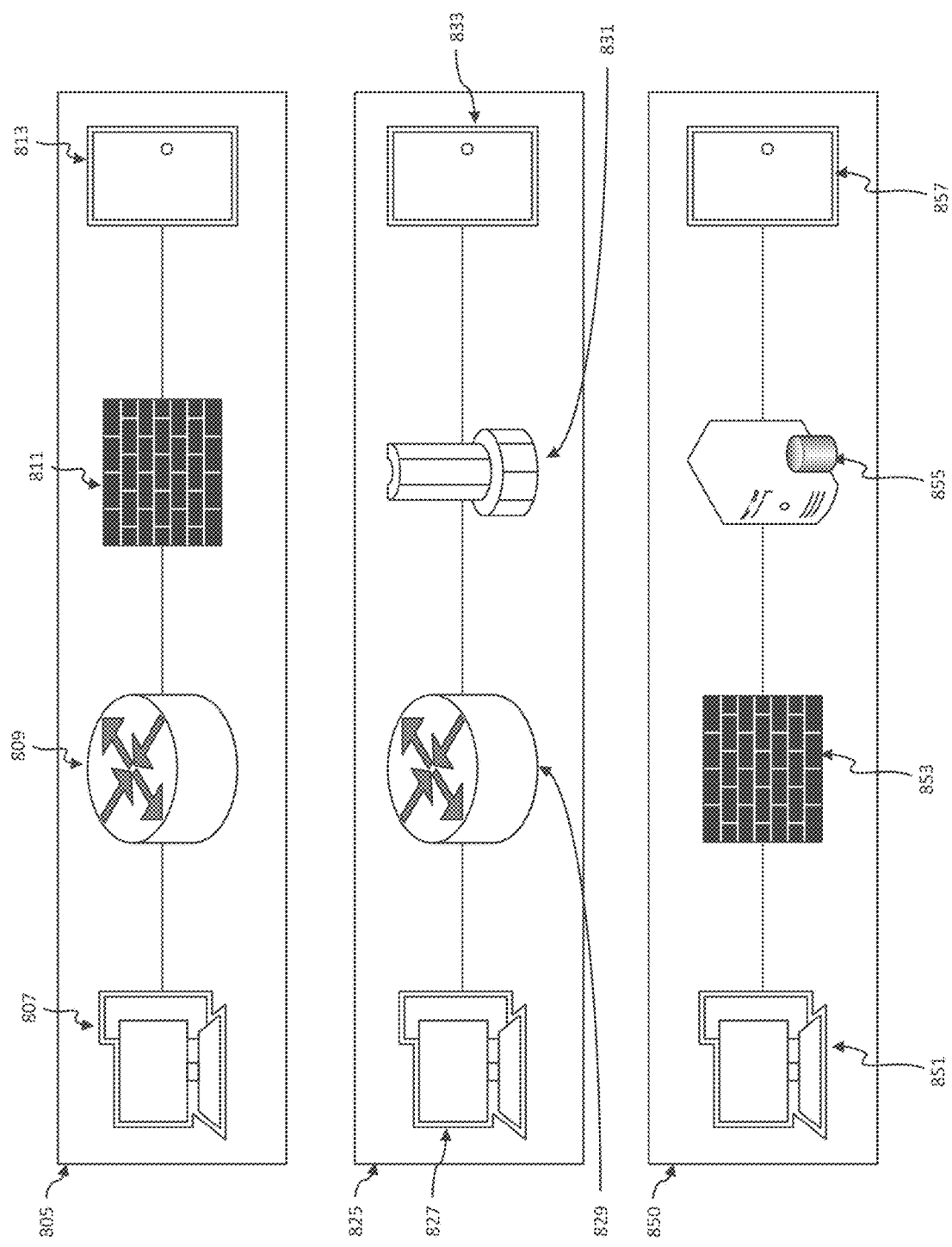
FIG. 8 is a block diagram illustrating a plurality of exemplary service chains according to one or more examples of the present disclosure.

Further MERIT testing, training, or evaluation may be based on tests related to a plurality of different service chain types. FIG. 8 illustrates exemplary service chains according to one or more examples of the present disclosure. A firewall service chain 805 may be a service chain of the plurality of service chains. The firewall chain may include a client VM 807, a switch VM 809, a firewall VM 811, and a server VM 813. An intrusion detection service (IDS) chain 825 may be a service chain of the plurality of service chains. The IDS chain 825 may include a client VM 827, a switch VM 829, an IDS VM 831, and a server VM 833. A web caching service chain 850 may be a service chain of the plurality of service chains. The web caching service chain 850 may include a client VM 851, a firewall VM 853, a cache VM 855, and a server VM 857.

The testing of the plurality of different service chain types may be used to evaluate rehoming strategies for multiple VNFs within each of the different service chain types when the multiple VNFs within each of the different service chain types are simultaneously rehomed. The evaluation may be used to obtain insight into how a real deployment would respond to instances where the entire service chain needs to be rehomed in response to a hotspot, maintenance, or failures. The insight may be based on service chain specific metrics, for example, a chain rehoming delay or a chain downtime. Chain rehoming delay may be based on a sum of a rehoming delay for all VNFs in the service chain being rehomed and represents a rehoming cost incurred by a service provider. Chain downtime may be a time until the service chain's end-to-end connectivity is restored and may be defined as a maximum connectivity downtime across all VNFs in the service chain. Accordingly, by utilizing the service chain specific metrics when evaluating a service chain, rehoming costs for a given VNF in the service chain may now be dependent on the rehoming actions of other VNFs in the service chain. By considering rehoming cost dependencies of VNFs in the service chain when evaluating the service, potential network contention that could occur when multiple rehoming action occur simultaneously may be considered.

Additional considerations for rehoming actions that can be performed on VNFs in the service chain during testing may include whether or not a VNF in the service chain is stateful (e.g., a firewall VM, an IDS VM or a cache VM), that is whether the VNF does or does not retain a state. If the VNF is stateful, rehoming actions available to be performed on the VNF may decrease. For example, the rehoming action 'rebuild' may not be available because performing this rehoming action will result in loss of disk state for the stateful VNF. For example, the rehoming action 'cold migrate' may not be available because performing this rehoming action would result in contents being cached in memory. Accordingly, a feasibility of whether or not a rehoming action can be performed on each VNF in the service chain is contemplated.

When MERIT is employed to preform rehoming actions to VNFs in a service chain, MERIT may monitor all relevant VNF parameters, such as image size, disk size, available bandwidth, page dirty rate, etc. Based on information obtained by monitoring the VNF parameters, MERIT may generate possible combinations of feasible actions for each VNF in a service chain. For each combination of rehoming delay and connectivity downtime models may be applied to each VNF to predict a rehoming delay or connectivity downtime for each VNF, taking into account the resource contention created by simultaneous rehoming actions. MERIT may use the predictions to calculate the chain rehoming delay, R, or chain downtime, D, for each combination. MERIT may utilize the chain rehoming delay or chain downtime for each combination to select a rehoming action combination that is predicted to maximize a given generic utility function, U(R;D). In addition, MERIT may estimate an available bandwidth for each VNF rehoming action in order to account for network resource contention due to multiple VNF performing rehoming actions simultaneously. The available bandwidth estimation may take into account how many VNFs are in the service chain, as well as a type of rehoming action being applied to a given VNF in the service chain. Background traffic may also be considered and accounted for by subtracting the amount of background traffic from the available bandwidth.

Accordingly, MERIT calculations may be based, for example, in consideration that network bandwidth of a host operating at ß MB/s. If a service chain has n VNFs on the host, then the available bandwidth for each VNF will be ß/n, assuming an equivalent amount of state (e.g., disk, memory, in-memory state of an original VM to be migrated, etc.) for each VNF. If the amount of state to be transferred is different for different VNFs, the network bandwidth computation is more complex. For example, when considering chain with two VNFs performing simultaneous rehoming actions, a first VNF may have a state migration of $x_1$ MB and a second VNF may have a state migration of $x_2$ MB, where $x_2 > x_1$. If fair sharing is assumed, a bandwidth (BW) for VNF 1 may be calculated as $\beta 1 = \beta/2$ MB/s during a state migration time T1, where $$T1 = \frac{x_1}{\beta/2} \text{ seconds.}$$

An available bandwidth for VNF2 may be ß/2 at time T1, during which the VNF2 migrates $x_1$ MB of state, and an available bandwidth ß for time $(x_2-x_1)/\beta$. Thus, a state migration time for VNF 2 is $$T2 = T1 + (x2-x1)/B = \frac{x1+x2}{\beta} \text{ seconds,}$$

and a time-averaged BW of x2/T2=x2·B/x1+x2 MB/s. In general, for a host with n VNFs, with the VNFs indexed in increasing order of state migration size x1<x2<...<xn, a state migration time and BW for the ith VNF may be the following:

$$Ti = x1/B/n + x2 - x1/B/(n-1) + \ldots = \frac{\sum_{j=1}^{i-1} x_j + (n-i+1) \cdot x_1}{B}$$

$$Bi = xi/Ti = \frac{xi \cdot B}{x1 + x2 + \ldots xi - 1 + (n-i+1) \cdot xi}$$

where Ti may not be equivalent to a rehoming delay because Ti additionally accounts for delays due to rehoming process specifics. The model training captures these additional delays as a function of the features (e.g., image size of an original VM (IMG), an instance size, denoted by its memory capacity (MEM), VM CPU usage (CPU), available bandwidth (BW), mean I/O wait time (IOµ), standard deviation of I/O wait time (IOσ), disk size (DSK), working set size (WSS), modified words per page (MWP), working set entropy (WSE), or nonworking set entropy (NWSE), etc.).

To compute the state size, xi, a rehoming action to be performed on VNF i may be considered. For the rehoming action 'rebuild', no state transfer may be involved. For the rehoming action 'cold migrate', disk contents may be transferred over a network. For the rehoming action 'live migrate', under a shared storage scenario, memory contents, iteratively dirtied pages, or a final dirty memory during a stop-and-copy phase may contain the state to be migrated. The size of the state may be estimated based on the PDR or available network bandwidth. For the rehoming action 'live migrate', under a non-shared storage scenario, in addition to the information used under a shared storage scenario, a disk size or image size may also be obtained (e.g., via hypervisor logs). Accordingly, using these calculations and considerations, MERIT may provide rehoming recommendations for the various service chains that minimize chain rehoming delays or chain downtime.

Figure 9:
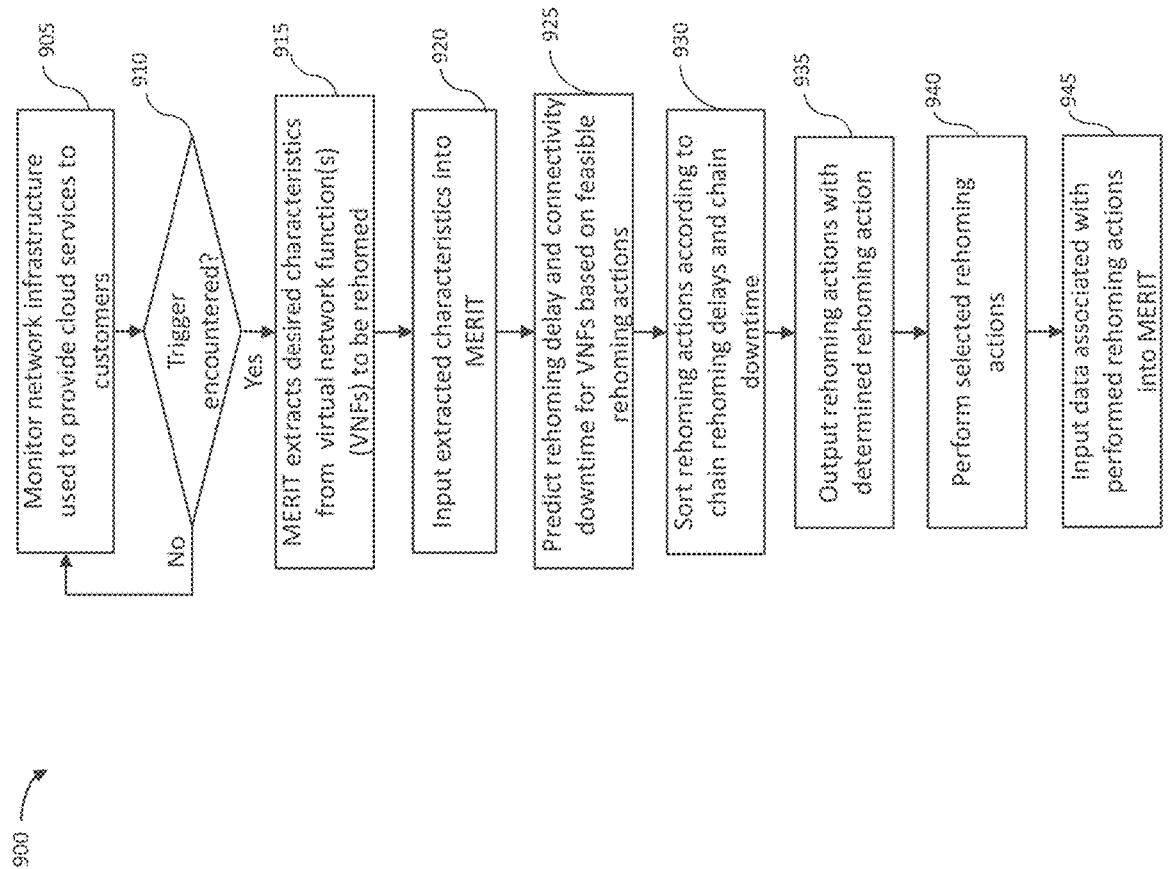
FIG. 9 is a flowchart a method for providing a rehoming recommendation for one or more virtual network functions (VNFs) within a service chain according to one or more examples of the present disclosure.

FIG. 9 is a flowchart of a method 900 for providing a rehoming recommendation for one or more virtual network functions (VNFs) within a service chain according to one or more examples. At block 905, a network service provide may monitor a cloud infrastructure associated with the service provider. At block 910, based on monitoring the cloud infrastructure, a determination of whether one or more triggers (e.g., an indication of hotspots on a component of a server, virtual machine (VM) workload shifts, network failures, network upgrades, etc.), indicating that one or more virtual network functions (VNFs) in a service chain should be rehomed, can occur. If a trigger has not been encountered, the method returns to block 905.

If a trigger has occurred, the method proceeds to block 915 where a Model-driven Rehoming Technique (MERIT) application associated with an enhanced control, orchestration, management and policy platform, (ECOMP platform 100) may extract one or more characteristics (e.g., image size of an original VM (IMG), an instance size denoted by its memory capacity (MEM), VM CPU usage (CPU), available bandwidth (BW), mean I/O wait time (IOµ), standard deviation of I/O wait time (IOσ), disk size (DSK), working set size (WSS), modified words per page (MWP), working set entropy (WSE), or nonworking set entropy (NWSE), etc.) from the VNFs that should be rehomed. At block 920, the extracted one or more characteristics may be input into MERIT for analysis and modeling. At block 925, MERIT may use the one or more characteristics to model a rehoming delay or a connectivity downtime for each feasible action that can be performed by each VNF that should be rehomed in order to predict costs associated with rehoming each VNF, prior to rehoming.

At block 930, MERIT may sort the feasible actions that can be performed by each VNF according to an associated rehoming delay or connectivity downtime. For example, the action having a lowest rehoming delay or connectivity downtime may be deemed an optimal rehoming action for an associated VNF. In an instance where multiple VNFs are being rehomed, the sorting may be based on a total rehoming delay or connectivity downtime for the multiple VNFs.

At block 935, MERIT may output recommended/optimal rehoming actions for an associated VNF in the service chain based on the sort of feasible actions that can be performed by each VNF, via a client virtual machine (e.g., VM 705, VM 807, VM 827 or VM 851). At block 940, MERIT may perform the recommended rehoming actions for an associated VNF in the service chain. At block 945, MERIT may input the sort of feasible actions that can be performed by each VNF into a modeling portion of MERIT in order to further refine predicting optimal rehoming actions by MERIT.

As described herein, a cloud infrastructure may include a Model-driven Rehoming Technique (MERIT) application, which may be used to analyze an effect of various parameters on different rehoming actions that may be performed on a virtual network function (VNF) in a service chain to determine how to optimally rehome a VNF in the service chain in response to hotspots, upgrades or failures. MERIT may determine optimal rehoming actions for each VNF in a service chain, as well as the entire service chain. MERIT may include several features, such as (1) Model-driven: MERIT may develop VNF-agnostic models for each rehoming action based on detailed empirical studies that capture an impact of various parameters such as image size, available memory, etc., on connectivity downtime or rehoming delay; (2) Contention aware: MERIT may account for the resource contention that results when rehoming an entire service chain as multiple rehoming actions that migrate states simultaneously across a network or on shared storage; or (3) Graybox: MERIT may leverage an information exchange (e.g., a statefulness of certain VNFs) between tenants and a network provider to identify the feasible rehoming actions for each VNF.

As described above, the examples can be in the form of processor-implemented processes and devices for practicing those processes, such as a server in a regional network or cloud data center. The examples may be embodied as a centralized or distributed hardware and software. The examples can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the exemplary embodiments. Thus, a computer-readable storage medium is not a signal. A computer-readable storage medium is not a transient signal. Further, a computer-readable storage medium is not a propagating signal. A computer-readable storage medium as described herein is an article of manufacture. The examples can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the examples. When implemented on a general-purpose microprocessor, the computer program code segments configure the microprocessor to create specific logic circuits.

While the disclosed subject matter has been described with reference to examples, it will be understood by those skilled in the art that various changes may be made and equivalents may be substituted for elements thereof without departing from the scope. In addition, many modifications may be made to adapt a particular situation or material to the teachings of the disclosed subject matter without departing from the essential scope thereof. Therefore, it is intended that the subject matter disclosed herein not be limited to the particular examples disclosed for carrying out this disclosed subject matter, but that the disclosed subject matter will include all examples falling within the scope of the claims. Moreover, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of the referenced items. In addition, the use of the word "or" is generally used inclusively unless otherwise provided herein.

What is claimed:

1. An apparatus comprising:
a processor; and
a memory coupled with the processor, the memory comprising executable instructions stored thereon that when executed by the processor cause the processor to effectuate operations comprising:
determining whether a trigger has occurred within a cloud infrastructure;
in response to determining that the trigger has occurred, extracting characteristics from one or more virtual network functions (VNFs) of a service chain within the cloud infrastructure;
in response to extracting characteristics from the one or more VNFs of the service chain, determining rehoming actions for each of the one or more VNFs of the service chain based on a feasibility of whether or not each rehoming action of the rehoming actions can be performed by the one or more VNFs of the service chain, wherein the feasibility is one of an impact analysis of the rehoming actions, contention analysis of the rehoming actions, or a state of VNFs associated with the rehoming actions;
in response to determining rehoming actions, predicting a rehoming delay or a connectivity downtime for each of the rehoming actions for each of the one or more VNFs of the service chain;
determining an optimal rehoming action from the rehoming actions for at least one of the one or more VNFs of the service chain using the rehoming delay or the connectivity downtime for each rehoming action of the rehoming actions; and
performing the optimal rehoming action for the at least one of one or more VNFs of the service chain.

2. The apparatus of claim 1, wherein the processor effectuates further operations comprising inputting the optimal rehoming action for each of the one or more VNFs in the service chain into a Model-driven Rehoming Technique (MERIT) application.

3. The apparatus of claim 2, wherein the processor effectuates further operations comprising refining analysis and modeling of rehoming actions performed by the MERIT application.

4. The apparatus of claim 1, wherein the rehoming delay is a time to perform a rehoming action.

5. The apparatus of claim 1, wherein the connectivity downtime is a time until an end-to-end connectivity of the service chain is restored.

6. The apparatus of claim 1, wherein the trigger is one of: a hotspot, a virtual machine (VM) workload shift, a network failure, and a network upgrade.

7. The apparatus of claim 1, wherein the rehoming actions are one of: a live migration, a cold migration, and a rebuild.

8. The apparatus of claim 1, wherein the predicting the rehoming delay or a chain downtime for each of the rehoming actions for each of the one or more VNFs of the service chain accounts for network contention due to simultaneous rehoming of each of the one or more VNFs of the service chain.

9. A system comprising:
a processor;
a memory coupled with the processor; and
an analytics application within a cloud infrastructure and stored in the memory, the analytics application comprising executable instructions that when executed by the processor cause the processor to effectuate operations comprising;
determining whether a trigger has occurred within the cloud infrastructure;
in response to determining that the trigger has occurred, extracting characteristics from one or more virtual network functions (VNFs) of a service chain within the cloud infrastructure;
in response to extracting characteristics from the one or more VNFs of the service chain, determining rehoming actions for each of the one or more VNFs of the service chain based on a feasibility of whether or not each rehoming action of the rehoming actions can be performed by the one or more VNFs of the service chain, wherein the feasibility is one of an impact analysis of the rehoming actions, contention analysis of the rehoming actions, or a state of VNFs associated with the rehoming actions;
in response to determining rehoming actions, predicting a rehoming delay or a connectivity downtime for each of the rehoming actions for each of the one or more VNFs of the service chain;
determining an optimal rehoming action from the rehoming actions for at least one of the one or more VNFs of the service chain using the rehoming delay or the connectivity downtime for each rehoming action of the rehoming actions; and performing the optimal rehoming action for the at least one of one or more VNFs of the service chain.

10. The system of claim 9 wherein the system further comprises: a client virtual machine (VM), a switch within the cloud infrastructure, and a server VM.

11. The system of claim 9 wherein the service chain is one of: a firewall service chain, an intrusion detection system service chain, and a web caching service chain.

12. The system of claim 9, wherein the processor effectuates further operations comprising inputting the optimal rehoming action for each of the one or more VNFs of the service chain into an analytics application.

13. The system of claim 9, wherein the rehoming delay is a time to perform a rehoming action.

14. The system of claim 9, wherein the connectivity downtime is a time until an end-to-end connectivity of the service chain is restored.

15. The system of claim 9, wherein the trigger is one of: a hotspot, a virtual machine (VM) workload shift, a network failure, and a network upgrade.

16. The system of claim 9, wherein the rehoming actions are one of: a live migration, a cold migration and a rebuild.

17. The system of claim 9, wherein the predicting a rehoming delay or a chain downtime for each of the rehoming actions for each of the one or more VNFs of the service chain accounts for network contention due to simultaneous rehoming of each of the one or more VNFs of the service chain.

18. A computer readable storage medium storing computer executable instructions that when executed by a computing device cause said computing device to effectuate operations comprising:

determining whether a trigger has occurred within a cloud infrastructure;

in response to determining that the trigger has occurred, extracting characteristics from one or more virtual network functions (VNFs) of a service chain within the cloud infrastructure;

in response to extracting characteristics from the one or more VNFs of the service chain, determining rehoming actions for each of the one or more VNFs of the service chain based on a feasibility of whether or not each rehoming action of the rehoming actions can be performed by the one or more VNFs of the service chain, wherein the feasibility is one of an impact analysis of the rehoming actions, contention analysis of the rehoming actions, or a state of VNFs associated with the rehoming actions;

in response to determining the rehoming actions, predicting a rehoming delay or a connectivity downtime for each of the rehoming actions for each of the one or more VNFs of the service chain;

determining an optimal rehoming action from the rehoming actions for at least one of the one or more VNFs of the service chain using the rehoming delay or the connectivity downtime for each rehoming action of the rehoming actions; and performing the optimal rehoming action for the at least one of one or more VNFs of the service chain.

19. The computer readable storage medium of claim 18, wherein the rehoming delay is a time to perform a rehoming action and the connectivity downtime is a time until an end-to-end connectivity of the service chain is restored.

20. The computer readable storage medium of claim 18, wherein the predicting a rehoming delay or a chain downtime for each of the rehoming actions for each of the one or more VNFs of the service chain accounts for network contention due to simultaneous rehoming of each of the one or more VNFs of the service chain.

* * * * *

UNITED STATES PATENT AND TRADEMARK OFFICE
CERTIFICATE OF CORRECTION

| | |
|---|---|
| PATENT NO. | : 11,212,173 B2 |
| APPLICATION NO. | : 16/712594 |
| DATED | : December 28, 2021 |
| INVENTOR(S) | : Narayanan et al. |

It is certified that error appears in the above-identified patent and that said Letters Patent is hereby corrected as shown below:

On the Title Page

Item (73) Under Assignees, the second Assignee should read --The Research Foundation for The State University of New York--.

Signed and Sealed this
Nineteenth Day of September, 2023

Katherine Kelly Vidal
*Director of the United States Patent and Trademark Office*